May 5, 1959    T. T. EATON    2,885,668
PULSE ECHO DISTANCE AND VELOCITY DETERMINING DEVICES
Filed June 25, 1941    2 Sheets-Sheet 1
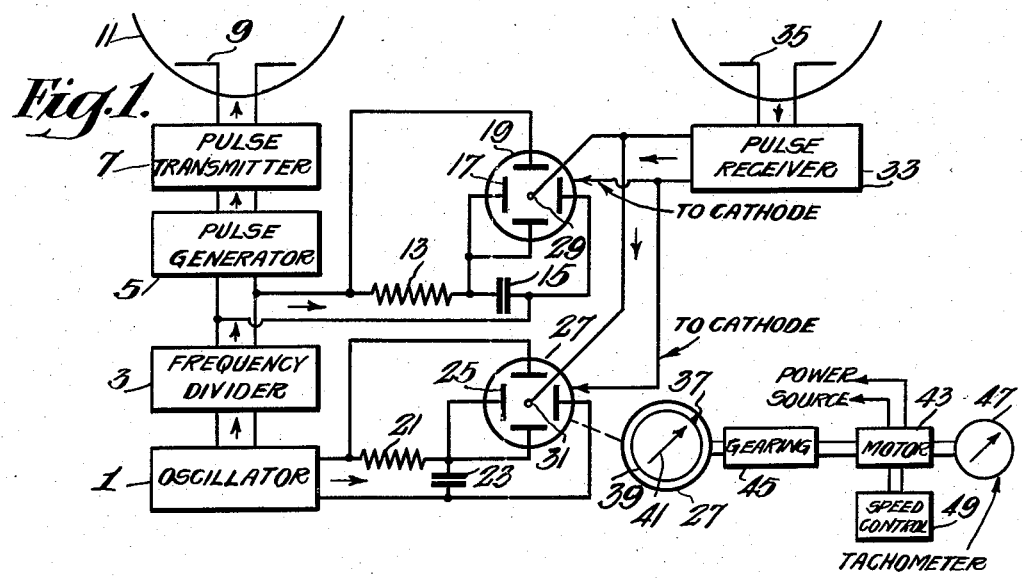
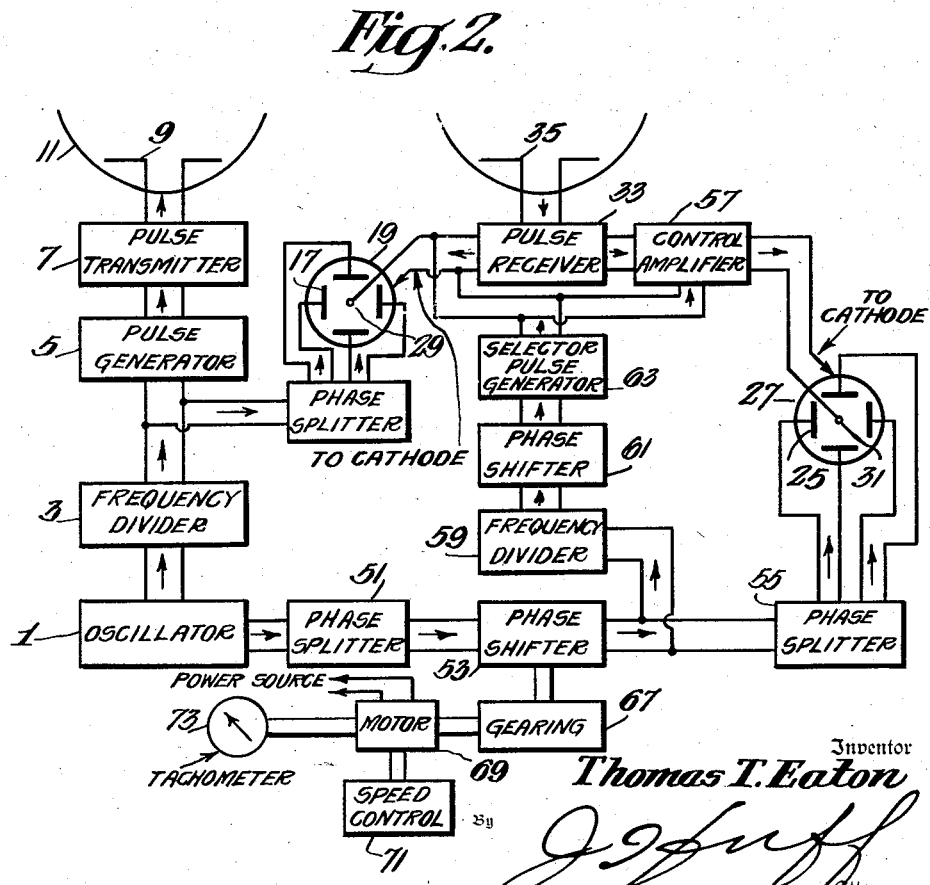
Inventor
Thomas T. Eaton
By
J. J. Huff
Attorney

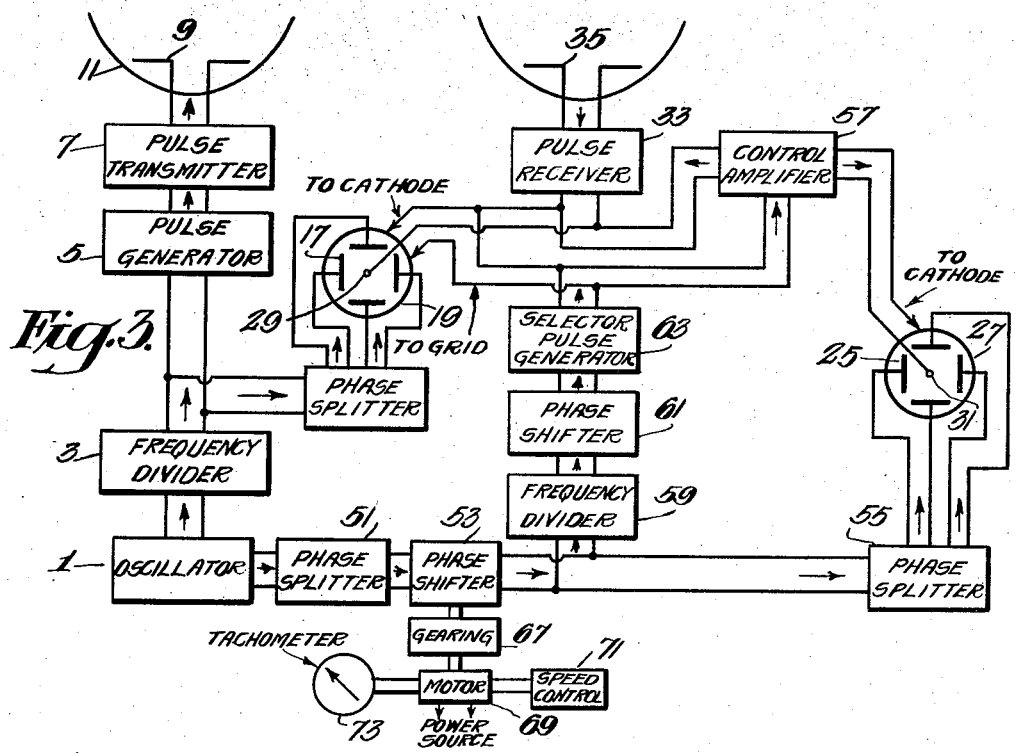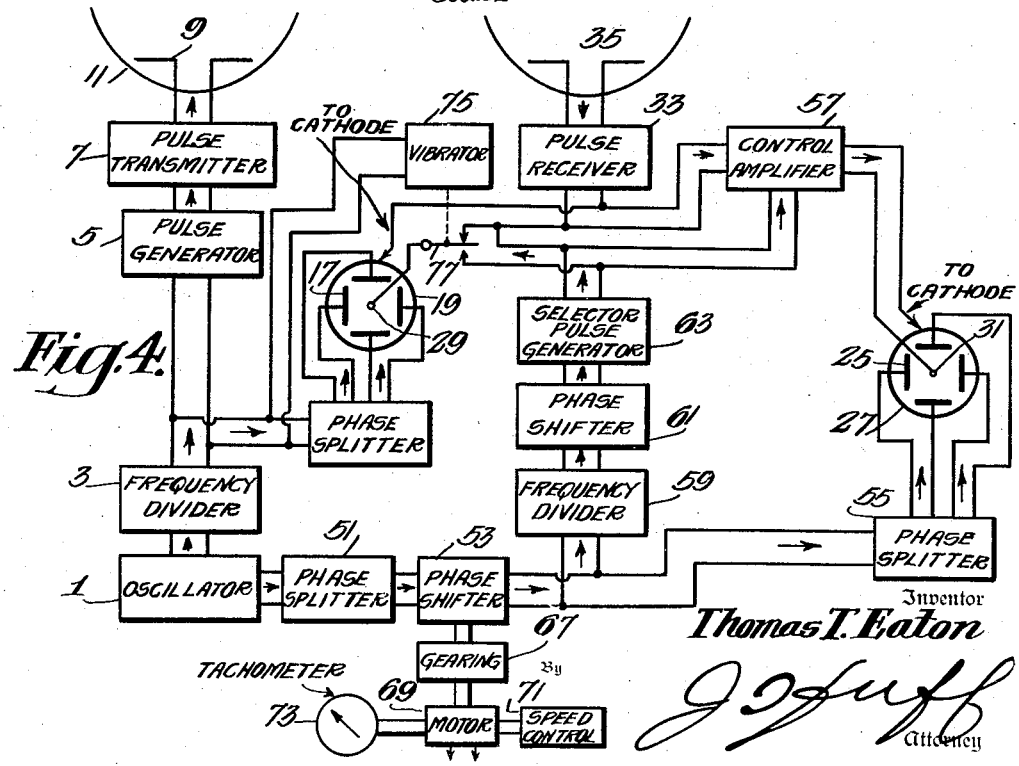

United States Patent Office 2,885,668
Patented May 5, 1959

2,885,668

PULSE ECHO DISTANCE AND VELOCITY DETERMINING DEVICES

Thomas T. Eaton, Haddon Heights, N.J., assignor to Radio Corporation of America, a corporation of Delaware Application June 25, 1941, Serial No. 399,606

18 Claims. (Cl. 343—9)

This invention relates to improvements in pulse echo velocity measuring devices and particularly to a pulse echo distance measuring system in which means are provided for determining the velocity at which a pulse reflecting object is moving toward or away from the pulse echo system.

Distances are measured by radiating a pulse of energy toward a pulse reflecting object and by indicating the time required for the pulse to travel to the object and back to a receiver, which is generally located near the transmitter. One convenient indicating means is a cathode ray tube in which the ray is swept along one coordinate as a function of time and along another coordinate by the received echo pulse. Since the distance is proportional to half the propagation time, it follows that the indicator may be calibrated in terms of distance so that the distance of a pulse reflecting object may be indicated directly. In practice, a plurality of pulses are radiated at a regular rate and the cathode ray sweep is operated in synchronism with the outgoing pulses.

If a reflecting object is moving toward or away from the pulse echo system, the received indicated signal will also move on the indicator because the distance is varying. Another view of the phenomena is that Doppler effects increase or decrease the pulse rate of the echo signals. In numerous uses, it would be helpful to know not only the distance of the object but also the component of the object velocity with respect to the system. While it is possible to measure the time required for the received pulse to travel a known distance on the indicator scale and to calculate the rate of movement of the object, such method is both slow and inaccurate. It is one of the objects of the instant invention to provide means in a pulse echo system for determining accurately and quickly the rate of movement of a pulse reflecting object. Another object is to provide improved means for indicating the rate of movement of an object as a function of the change of frequency of echo signals from the object. Another object is to provide means for increasing the angular velocity of pulse signal indications from a moving object so that the rate of movement of the object may be determined by following the indications at a determinable rate. An additional object is to provide means for arresting the movement of pulse signal indications from a moving object so that the rate of movement of the object may be determined from the forces required to arrest said movement.

The invention will be described by referring to the accompanying drawing in which Fig. 1 is a schematic diagram of one embodiment of the invention; Fig. 2 is a schematic diagram of an improved embodiment; and Figs. 3 and 4 are schematic diagrams of variations of the preferred embodiment of the invention. Similar reference characters will be applied to similar elements in the drawings.

Referring to Fig. 1, a timing oscillator 1 is connected through a frequency divider 3 to a pulse generator 5. The output of the pulse generator is applied to a transmitter 7, whose output circuit includes an antenna 9. The antenna may be made directive by a reflector 11. The output of the frequency divider is applied to a phase splitting network including a resistor 13 and capacitor 15. The two phase current from the network is applied to the deflecting elements 17 of a cathode ray tube 19 to apply thereto a circular sweep voltage.

The oscillator 1 is also connected through a phase splitting network including a resistor 21 and a capacitor 23. The two phase current from the network is applied to the deflecting electrodes 25 of a second cathode ray tube 27. Radial deflecting electrodes 29, 31 in the cathode ray tubes 19, 27, respectively, are connected to a pulse receiver 33 which is in turn connected to an antenna 35 which may be directive like the transmitting antenna. In some installations a common antenna may be used for transmitting and receiving.

The circular sweep of the first cathode ray indicator 19 may be calibrated to read the distance of a pulse reflecting object. The indication will appear as a radial deflection of the circular trace, although the signal pulse may be used to blank or to brighten the trace. The trace of the second indicator 27 will move with an angular velocity which is many times, say 100 times, faster than the first mentioned trace. The face of the cathode ray indicator 27 is repeated to the right of the tube to avoid confusion in the drawing, and the trace 39 and received signal 37 are indicated on the repeated face. Since the trace 39, and received signal 37 suitably applied thereto, move rapidly it is practical to determine accurately and quickly the rate of approach or recession of the pulse reflecting object. For example, if the distance scale is 100 miles, the sweep frequency will be approximately 930 cycles per second. The rate scale will be traced by a cathode ray rotated by a potential having a frequency of 93 kilocycles per second. The signal 37 may be followed by a pointer 41 driven by a variable speed motor 43 through suitable reduction gearing 45. The motor speed may be indicated by a tachometer 47, which may be calibrated in miles per hour or any other units. The motor speed may be varied by a speed controller 49 operated by the observer, who merely has to keep the pointer 41 and the indicated signal moving together.

The foregoing system represents a simplified pulse echo rate device with which it may be difficult to select and follow a single pulse of a plurality of pulses from a number of objects. This is especially true if several of the objects are moving at different rates. In the arrangement of Fig. 2, means are provided to distinguish the desired from the undesired traces of received pulses. The pulse transmitter arrangement 1, 3, 5, 7, 9, and 11 and the pulse receiver 33, 35 and distance indicator 19 are arranged as in the system of Fig. 1. The oscillator 1 is connected to a phase splitter 51 and thence to a phase shifter 53. The output of the phase shifter is applied through a second phase splitter 55 to the deflecting electrodes 25 of the rate or velocity indicator 27. The pulse signals from the receiver 33 are applied through a normally blocked control amplifier 57 to the radial deflecting electrode 31 of the cathode ray tube or rate indicator 27.

The currents from the phase shifter 53 are applied to a frequency divider 59 which produces a current of preferably approximately half the frequency of the pulse generator. The current of lower frequency is applied to a phase shifter 61 and hence to a pulse shaper 63, which may include tubes and circuits known to those skilled in television. The selector pulse generator 63 is connected to the radial deflecting electrode 29 of the range or distance indicator 19 and to the control amplifier 57. The phase shifter 53 is connected through suitable gearing 67 to a variable speed motor 69. A speed control 71 and a tachometer 73 are connected to the motor 69.

The operation is as follows: The distances of pulse reflecting objects are indicated on the distance scale of the cathode ray tube 19 in the conventional manner. However, all the indications, except the desired one, are blanked out by a pulse from the selector 63 at every other sweep of the cathode ray, if blanking pulses of half the pulse frequency are derived from the divider 59. Since the trace representing the selected pulse appears twice as often as the others, it will be distinguishable because it will be brighter. At the instant the trace of the selected pulse is made brighter, the control amplifier 57 is unblocked to permit the selected pulse to deflect the ray of the rate indicator tube 27.

An operator adjusts the phase and frequency of the sweep voltage, applied to the rate indicator tube 27, so that the pulse indication remains stationary. That is the sweep rate is increased or decreased by an amount corresponding to the Doppler effect produced by the component of motion of the pulse reflecting object in the direction of the pulse echo system. The change in the sweep rate is determined by the phase shifter 53, which is in turn controlled by the motor 69 whose speed is controlled by the operator. For each rotation of the phase shifter the phase is altered by 360° or 1 cycle. Hence, the sweep frequency in the cathode ray rate tube 27 may be increased or decreased so that the pulse indication or pulse trace is stationary and the frequency of the sweep is varied to indicate the rate of movement of the object, as a function of the angular velocity of the phase shifter.

It should be understood that the described method of measuring the component of velocity of the pulse reflecting object in the direction of the pulse apparatus may be used with various modifications of the apparatus. For example, the arrangement of Fig. 3 is essentially the same as that of Fig. 2 but in the device of Fig. 3 the selected pulse is indicated by applying a voltage from the selector pulse generator 63 to the grid electrode of the cathode ray tube to increase the intensity of the indication of the pulse. The selected pulse of proper phase may be applied once per sweep instead of every other sweep. The control amplifier 57 may likewise be opened or unblocked so that the selected pulse may be applied to the cathode ray rate tube 27 each time the pulse is received instead of every other time.

The arrangement illustrated in Fig. 4 includes a vibrator 75 or motor controlled switch 77 which is used to connect alternately the radial deflecting electrode of the distance indicating cathode ray tube to the receiver 33 or to the selector pulse generator 63. The polarity of the potentials applied to the radial electrode from the generator may be reversed from that of the signal pulses so that the signal pulses reflect the ray outwardly and the selection pulses reflect the ray inwardly. In the arrangement of the several devices of Figs. 2, 3 and 4, the selected pulse from the generator 63 will not only indicate the selection by brightening or dimming the trace corresponding to a reflected pulse, but the distinguishing trace may be arrested in movement or made stationary. This arresting movement of the selected trace is effected by the operator regulating the phase or angular velocity of the trace by means of the variable speed motor 69 and the phase shifter 53 controlled thereby.

Instead of using manual control, any suitable follow-up system may be connected between the rate tube 27 and the speed control 71. One example of the follow-up system would be a pair of light responsive devices positioned on either side of the indication which is to be made stationary. A movement of the spot toward one light responsive device would speed up the motor and correspondingly increase the scanning rate; a movement in the opposite direction would decrease the motor speed and correspondingly decrease the scanning rate. Such a follow-up device is disclosed in U.S. Patent 1,585,210, which issued to Max Roux on May 18, 1926.

Reference is made to the copending application Serial No. 196,863, filed March 19, 1938, by Irving Wolff, now Patent 2,407,198, issued September 3, 1946, for "Distance and Directional Determination System," which discloses a suitable phase shifter. The other components of the system are well known to those skilled in the art and therefore require no detailed description herein. It should be understood that both distance and velocity indications may be applied to a single or composite indicator and that the velocity indicator may be used with or without the distance indicator.

I claim as my invention:

1. A pulse echo distance and velocity determining device including in combination a pulse transmitter, a pulse receiver, means connected to said receiver for indicating the distances of pulse reflecting objects as a function of the time between transmitted and received reflected pulses, additional means for indicating pulse signals reflected from a moving object as a function of substantially a sub-multiple of said time between pulses so that the indication moves at a determinable rate, and means including said additional indicating means for determining the component of velocity of said moving object in the direction of said pulse transmitter and pulse receiver as a function of said indication movements.

2. A pulse echo distance and velocity determining device including in combination a pulse transmitter, a pulse receiver, means connected to said receiver and synchronized with the pulses from said transmitter for indicating the distances of pulse reflecting objects, a second means connected to said receiver for indicating the reception of pulses reflected from a moving body, means connected between said pulse transmitter and said second indicating means for synchronizing said second indicating means at a multiple of said first synchronizing rate, and means including said second indicating means for indicating the velocity of said moving body toward said pulse transmitter and receiver.

3. A pulse echo distance and velocity determining device including in combination a pulse transmitter for radiating pulse energy at a predetermined rate, a pulse receiver responsive to said pulse energy, a cathode ray distance indicator including means for sweeping said ray along one coordinate in synchronism with said radiated pulses, means for applying received reflected pulses to said indicator so that the distance of a pulse reflecting body may be indicated, a second cathode ray indicator including means for sweeping said ray along one coordinate in synchronism with said radiated pulses and at a rate higher than said predetermined rate, means for applying received pulses reflected from a moving body to said second cathode ray indicator, so that indications of said received pulses move along the said coordinate of said second cathode ray tube at a velocity proportional to the component of motion of said body toward said pulse transmitter and receiver, and means for determining the velocity of said component of motion as a function of said moving indications.

4. A pulse echo distance and velocity determining device including in combination a pulse transmitter for radiating pulse energy at a predetermined rate, a pulse receiver responsive to said pulse energy, a cathode ray distance indicator including means for sweeping said ray along one coordinate in synchronism with said radiated pulses, means for applying received reflected pulses to said indicator so that the distance of a pulse reflecting body may be indicated, a second cathode ray indicator including means for sweeping said ray along one coordinate in synchronism with said radiated pulses and at a rate higher than said predetermined rate, means for applying received reflected pulses from a moving body to said second cathode ray indicator, so that indications of said received pulses move along the said coordinate of said second cathode ray tube at a velocity proportional to the component of motion of said body toward said pulse transmitter and receiver, and means cooperating with said second indicator for determining the velocity of said component of motion as a function of said moving indications.

5. A pulse echo distance and velocity determining device including in combination a pulse transmitter for radiating pulse energy at a predetermined rate, a pulse receiver responsive to said pulse energy, a cathode ray distance indicator including means for sweeping said ray along one coordinate in synchronism with said radiated pulses, means for applying received reflected pulses to said indicator so that the distance of a pulse reflecting body may be indicated, a second cathode ray indicator including means for sweeping said ray along one coordinate in synchronism with said radiated pulses and at a rate higher than said predetermined rate, means for applying received reflected pulses from a moving body to said second cathode ray indicator, so that indications of said received pulses move along the said coordinate of said second cathode ray tube at a velocity proportional to the component of motion of said body toward said pulse transmitter and receiver, and means including a motor driven indicator for following said moving indications and for indicating the velocity of said component of motion as a function of the velocity of said motor.

6. A pulse echo distance and velocity determining device including in combination a pulse transmitter for radiating pulse energy at a predetermined rate, a pulse receiver responsive to said pulse energy, a first cathode ray indicator including means for sweeping said ray along a distance coordinate in synchronism with the radiation of said pulses, means connected to said receiver for applying to said indicator reflected pulses received from a moving body to indicate the distance of said body, a second cathode ray indicator including a sweep faster than the sweep of said first indicator, means for applying said received reflected pulses to said second indicator to indicate the component of said motion of said body toward said device, means for changing the speed of said second sweep so that indications of pulses from said moving body are made stationary, and means for indicating the velocity of said component of motion as a function of said speed changing means.

7. A pulse echo distance and velocity determining device including in combination a pulse transmitter for radiating pulse energy, a pulse receiver responsive to said pulse energy, a first cathode ray indicator including means for sweeping said ray over a distance scale, means connected to said receiver and to said indicator for applying received echo pulses to vary said ray to indicate the distance of a pulse reflecting body, a second cathode ray indicator including means for sweeping its ray faster than the ray is swept in said first indicator, means for applying to said second indicator echo pulses received from a moving body having a component of motion toward said distance indicating device to indicate said moving body, means for varying the velocity of said second sweep so that the indications on said second indicator remain stationary notwithstanding said component of motion, and means for indicating the velocity of said component of motion as a function of the rate at which said sweep is varied.

8. A pulse echo distance and velocity determining device including in combination a pulse transmitter for radiating pulse energy, a pulse receiver responsive to said pulse energy, a first cathode ray indicator including means for sweeping said ray over a circular distance scale, means connected to said receiver and to said indicator for applying received echo pulses to deflect said ray to indicate the distance of a pulse reflecting moving body, a second cathode ray indicator including means for sweeping its ray at an angular velocity greater than the ray is swept in said first indicator, means for applying to said second indicator echo pulses received from said moving body having a component of motion toward said distance indicating device to indicate said moving body, means for varying the angular velocity of said second sweep so that the indications on said second indicator remain stationary notwithstanding said component of motion, and means for indicating the velocity of said component of motion as a function of the rate at which said sweep is varied.

9. A device according to claim 8 including means for distinguishing the indication of the pulses selected to determine the velocity of said moving body.

10. A pulse echo distance and velocity determining device including means responsive to pulse echoes for indicating the distance of a pulse reflecting moving body and for indicating visually the component of motion of said body with respect to said device, an indicator, means for moving said indicator so that it will follow said visual indication, and means coupled to said moving means for indicating the velocity of said component of motion of said moving body as a function of the velocity of said indicator movement.

11. A pulse echo distance and velocity determining device including means responsive to pulse echoes for indicating the distance of a pulse reflecting moving object and for indicating visually the component of motion of said object with respect to said device, means for applying a force to prevent said visual indication from changing as said distance varies, and means responsive to said force applying means for indicating the velocity of said component of motion as a function of the time rate of change of said applied force.

12. A pulse echo velocity determining device including means responsive to pulse echoes for indicating visually the component of motion of a pulse reflecting moving object as the object moves in the direction of said device, means for applying a force to arrest the movements of said indication as the object moves, and means responsive to said force applying means for indicating the velocity of said component of motion as a function of the time rate of applying said force.

13. A pulse echo velocity determining device including means responsive to pulse echoes for indicating visually the component of motion of a pulse reflecting moving object as the object moves toward or away from said device, an indicator movable with respect to said visual indications, means for moving said indicator in synchronism with said visual indications, and means coupled to said moving means for indicating the velocity of said component of motion as a function of said indicator movements.

14. The combination, in a pulse echo system, means to transmit recurrent pulses and to receive echoes thereof during the intervals between said pulses, a viewing screen, means to indicate said echoes on said viewing screen in space sequence corresponding to the time sequence in which said echoes are received, a gate device having an output circuit, means to supply all of said echoes to said gate device, means to control said gate device, to select a desired echo whereby only said selected echo appears in said output circuit, and means to ascertain, independently of said viewing screen, information as to the distant object producing the selected echo from the time relation between the transmitted pulses and the selected echo in said output circuit of said gate device.

15. The combination, in a pulse system, means for radiating pulses to distant objects and for receiving energy from each of said objects in response to said radiation, a viewing screen, means for indicating said received energy on said viewing screen in space sequence corresponding to the time sequence in which the energy from each of said objects is received, a gate device having an output circuit, means for supplying the received energy from each of said objects to said gate device, means for controlling said gate device to select the received energy from a desired one of said objects whereby only the selected energy appears in said output circuit, and means for ascertaining, independently of said viewing screen, information as to the distant object producing the selected energy from the time relation between the transmitted pulses and the selected energy in said output circuit of said gate device.

16. The combination, in a pulse system, means for radiating pulses to distant objects and for receiving energy from each of said objects in response to said radiation, a viewing screen, means for indicating said received energy on said viewing screen in space sequence corresponding to the time sequence in which the energy from each of said objects is received, a gate device having an output circuit, means for supplying the received energy from each of said objects to said gate device, means for controlling said gate device to select the received energy from a desired one of said objects whereby only the selected energy appears in said output circuit, and means for ascertaining, independently of said viewing screen, velocity information as to the distant object producing the selected energy from the time relation between the transmitted pulses and the selected energy in said output circuit of said gate device.

17. A pulse distance and velocity determining device including in combination a pulse transmitter for radiating pulses to distant objects, a pulse receiver for receiving energy from each of said objects in response to said radiation, means connected to said receiver for indicating the distances of said objects as a function of the time between said radiated pulses and said received energy, additional means for indicating said received energy from said objects as a function of substantially a multiple of the repetition rate of said radiated pulses so that the indications move at a determinable rate, and means including said additional indicating means for determining the component of velocity of a selected one of said objects having said component of motion with respect to said device along a line from said device to said selected object.

18. A velocity determining device including in combination a pulse transmitter for radiating pulses to distant objects, a pulse receiver for receiving energy from each of said objects in response to said radiation, means connected to said receiver for producing an indication to indicate the component of motion of one of said objects which component is relative to said device and along a line from said device to said object, means for applying a force to arrest the movements of said indication as the object moves, and means responsive to said force applying means for obtaining the velocity of said component of motion as a function of the time rate of applying said force.

References Cited in the file of this patent

UNITED STATES PATENTS

| | | |
|---|---|---|
| 1,924,156 | Hart | Aug. 29, 1933 |
| 2,189,549 | Hershberger | Feb. 6, 1940 |
| 2,227,598 | Lyman et al. | Jan. 7, 1941 |